(12) United States Patent
Byun et al.

(10) Patent No.: US 7,871,654 B2
(45) Date of Patent: Jan. 18, 2011

(54) MANUFACTURING METHOD OF SPACE KIMCHI WITH SHELF STABILITY UNDER THE SEVERE ENVIRONMENT

(75) Inventors: Myung-Woo Byun, Daejeon (KR); Ju-Woon Lee, Jeongeup-si (KR); Jae-Hun Kim, Jeongeup-si (KR)

(73) Assignee: Korea Atomic Energy Research Institute, Taejon-Si (KR)

( * ) Notice: Subject to any disclaimer, the term of this patent is extended or adjusted under 35 U.S.C. 154(b) by 1019 days.

(21) Appl. No.: 11/701,840

(22) Filed: Feb. 2, 2007

(65) Prior Publication Data

US 2008/0057167 A1    Mar. 6, 2008

(30) Foreign Application Priority Data

Aug. 31, 2006   (KR) ...................... 10-2006-0083502

(51) Int. Cl.
*A23L 3/26*   (2006.01)
*A23B 7/10*   (2006.01)

(52) U.S. Cl. .................. 426/234; 426/521; 426/393; 426/240; 426/412; 426/524

(58) Field of Classification Search ................ 426/234, 426/393, 240, 520, 521, 524, 312, 407; 99/451, 99/483; *A23B 007/10; A23L 003/26*
See application file for complete search history.

(56) References Cited

U.S. PATENT DOCUMENTS 3,573,067 A * 3/1971 Shults ........................ 426/234

FOREIGN PATENT DOCUMENTS

| KR | 9004271 B | * | 6/1990 |
| KR | 9105282 B | * | 7/1991 |
| KR | 2004005423 A | * | 1/2004 |

OTHER PUBLICATIONS

Se-Sik Kang, et al., Preservation of Kimchi by Ionizing Radiation, Kor. J. Food Hygiene, vol. 3, pp. 225-232, 1988.
Bo-Sook Cha, et al., Evaluation of Gamma Irradiation for Extending . . . , Korean J. Food Sci. Technol., vol. 21, No. 1, pp. 109-119, 1989.

* cited by examiner

*Primary Examiner*—Drew E Becker
*Assistant Examiner*—Steven Leff
(74) *Attorney, Agent, or Firm*—Lucas & Mercanti, LLP

(57) ABSTRACT

The present invention relates to a manufacturing method of kimchi with shelf stability and high quality under the severe environment, more precisely, a manufacturing method of kimchi with shelf stability and high quality under the severe environment such as desert, alpine regions, poles and space which includes the step of irradiation after heating, gas exchange packaging and quick freezing. The manufacturing method of kimchi of the present invention reduces the chances of deterioration of the sensory quality and physico-chemical characteristics caused by the conventional sterilization methods including high temperature and high pressure treatment and high dose of irradiation, so that kimchi produced by this method has excellent shelf stability under the severe environment.

6 Claims, 3 Drawing Sheets

MANUFACTURING METHOD OF SPACE KIMCHI WITH SHELF STABILITY UNDER THE SEVERE ENVIRONMENT

CROSS-REFERENCE TO RELATED APPLICATION

This application claims the benefit of priority from Korean Patent Application No. 10-2006-0083502, filed Aug. 31, 2006, the contents of which are incorporated herein by reference.

TECHNICAL FIELD

The present invention relates to a manufacturing method of space Kimchi with shelf stability and high quality under the severe environment, more precisely a manufacturing method of Kimchi with long-term shelf stability under such severe environment as desert, alpine regions, poles and space by heating ripened Kimchi, gas exchange packaging and irradiating thereof.

BACKGROUND ART

Kimchi is the traditional Korean fermented vegetable food which has been an important element for the diet and nutrition for Koreans and has been acknowledged world-widely. The main vegetables for Kimchi are Korean cabbage and radish, to which garlic, ginger and hot pepper powder are added as spices and condiments and salts are added for salt-fermentation. Among many kinds of Kimchi, cabbage Kimchi is the most dominant, taking 70% of Kimchi intake. The Korean cabbage, the one major vegetable for Kimchi, contains sugar and lactobacilli which ferment the sugar included in the vegetables and spices and condiments to generate taste components such as organic acids including lactic acid and acetic acid, carbon dioxide and alcohol and functional components such as $\beta$-sitosterol, glucose inolate, isothiocyanate and capsaicin.

The long-term storage of Kimchi is limited because some time after ripening rancid microorganisms are growing in Kimchi to cause acidification, gas generation and tissue softening. Therefore, a special technique to prolong the storage time is required to increase the utility of Kimchi as an excellent fermented food.

The conventional methods for long-term storage of Kimchi are exemplified by refrigeration, freezing, heat sterilization, antiseptic treatment, the combination of antiseptic treatment, refrigeration and heat sterilization, high-salt treatment, applying a pH regulator, etc. However, these methods have problems of reducing quality and economic efficiency.

'Food irradiation' is to irradiate energy, such as gamma ray (Co-60 or Se-137), electron beam or X-ray, generated from radioactive materials or from a radioactive ray generator, to food at the level of 0.01 kGy~50 kGy for the purpose of germination inhibition, ripe extension, extermination of parasites and vermin, prevention of decomposition and sterilization of pathogenic microorganisms in food. A chemical fumigation agent such as ethyleneoxide has been used for sterilization of food and household goods, which is, though, lethal to human and destroys environment. Thus, most of advanced countries have been used food irradiation which is efficient and not harmful for human.

After studying on the method for gamma ray irradiation to increase the shelf stability of Kimchi based on the advantages of irradiation, Cha et al reported that the storage time of Kimchi at 10° C. was more than double when Kimchi was irradiated with low dose of gamma ray at the level of 2~3 kGy (Cha B S et al., *Korea J. Food Sci. Technol.* 21: 109-119, 1989). Kang et al also reported that when Kimchi was irradiated with gamma ray at the level of 3 kGy and then stored at 5° C., the storage time was extended more than two months, compared with when Kimchi was not irradiated before storage (Kang S S et al., *Korea J. Food Hygiene.* 3: 225-232, 1988). The proposed methods above are all using low dose of irradiation at the level of 5 kGy or less. However, to preserve Kimchi under the severe environment such as desert or space, complete sterilization is required and accordingly high dose of irradiation or high temperature treatment is required. However, over-irradiation or excessive heat-treatment on Kimchi results in the decrease of physical property, decolorization and development of other tastes and smells, drawing a limitation in industrialization of Kimchi.

The present inventors packed Kimchi with nitrogen charging in the ripening stage and treated the packed Kimchi with heat. Then, the Kimchi was quick-frozen, followed by irradiation. As a result, the present inventors completed this invention by confirming that the sensory quality of Kimchi was not reduced by heat and irradiation and the long-term shelf stability was prolonged even under the severe environment.

DISCLOSURE

Technical Problem

It is an object of the present invention to provide a manufacturing method of Kimchi with long-term shelf stability under the severe environment such as space by heating ripened Kimchi, gas exchange packaging, freezing and irradiating thereof.

Technical Solution

To achieve the above object, the present invention provides a manufacturing method of Kimchi with shelf stability under the severe environment which includes the following steps:

(1) Packaging the ripened Kimchi with nitrogen charging;
(2) Sterilizing the packed Kimchi by heat-treatment (primary sterilization);
(3) Quick-freezing the sterilized Kimchi and irradiating thereof.

In step (1), the cabbage Kimchi was prepared by the conventional method, which was then ripened. The Kimchi was cut and Kimchi juice was eliminated. The Kimchi was put in a pack, which was filled with nitrogen gas, leading to the gas exchange packaging. The major constituent of the kimchi is selected from a group consisting of Korean cabbage, radish, leaf mustard, scallion, onion, cucumber, dropwort and Korean leek. As a wrapping paper, polyethylene (PE), aluminum-laminated low density polyethylene (Al-LDPE), Polypropylene (PP), polyvinyl chloride (PVC), polyvinylidene chloride (PVDC), polyethylene terphthalate (PET), polycarbonates (PC) or nylon can be used and Al-LDPE is preferred but not always limited thereto. For the gas exchange packaging, air packaging, vacuum packaging, $CO_2$ gas exchange packaging or nitrogen gas exchange packaging can be used, but nitrogen gas exchange packaging is preferred considering the sensory quality, but not always limited thereto. The manufacturing method of the ripened kimchi of step (1) has pH 3.5~5.5 or acidity 0.2~0.8%.

In step (2), Kimchi packed in step (1) was sterilized by heat. The temperature for the sterilization was 40~80° C., more preferably 60~70° C. and most preferably 60~65° C. The heating time was less than 2 hours and more preferably 30 minutes.

In step (3), Kimchi primarily sterilized by heat in step (2) was quick-frozen in a deep freezer (CLN-40U, NIHON FREEZER, JAPAN), followed by irradiation.

Sensory quality decrease might be caused during the irradiation with high dose of gamma ray for complete sterilization, which is because of that water is ionized by irradiation and accordingly the cross-linking structure between cellulose and pectin is destroyed. The ionization of water is significantly affected by physical characteristics of the water. For example, freezing inhibits the activity of water molecules and minimizes ionization of water. And freezing characteristics of water depends on the freezing temperature. Kimchi was frozen at −20, −50, −70 and −197° C., and then irradiated at the levels of 10, 15, 20, 25 and 30 kGy, followed by evaluation of quality of the Kimchi. As a result, Kimchi frozen at −50° C. and −70° C., which are the temperature where all the water is frozen, and then irradiated with 20~25 kGy were proved to have best quality.

The radiant ray herein is limited to gamma ray, X-ray and electron beam with high energy. The source of the radiant ray used for the irradiation on food herein is exemplified by radionuclides such as Co-60 and Ce-137, X-ray generator having the energy level of up to 5 MeV, and electron beam apparatus having the energy level of up to 10 MeV, and Co-60 is more preferred as a source of the radiant ray.

The preferable dose of irradiation of the radiant ray was 10 kGy~50 kGy. And 15 kGy~30 kGy was more preferable and 20 kGy~25 kGy was most preferable irradiation dose. Less than 10 kGy results poor sterilization while over 40 kGy reduces the sensory quality.

The method of the present invention including the steps of nitrogen gas exchange packaging, heat-sterilizing and quick-freezing and irradiating was effective to prepare Kimchi with shelf stability under the severe environment, which was verified by microbiological, physicochemical or sensory analysis (see FIG. 1).

The completely sterilized Kimchi with improved shelf stability of the present invention was proved to have equal sensory quality with the general Kimchi ($p>0.05$). After acceleration storage at 50° C. for 2 hours and at 35° C. for 3 months, no microorganism was growing in the Kimchi of the invention (see FIG. 3). The results of physicochemical and sensory quality evaluation during the acceleration storage were not significantly different from the general Kimchi ($p>0.05$). For reference, gas generation with destroying wrapping was observed on the second day of storage of the general Kimchi and on the $4^{th}$ day of storage of the Kimchi packed by gas exchange packaging and treated with heat (see FIG. 2).

The above results indicate that Kimchi of the invention prepared by heating, quick-freezing and irradiating has no significant damage on the sensory quality and can be stored for long-term. The method of the present invention can improve not only the shelf stability of cabbage Kimchi but also the shelf stability of other fermented foods.

DESCRIPTION OF DRAWINGS

The application of the preferred embodiments of the present invention is best understood with reference to the accompanying drawings, wherein.

MODE FOR INVENTION

Figure 1:
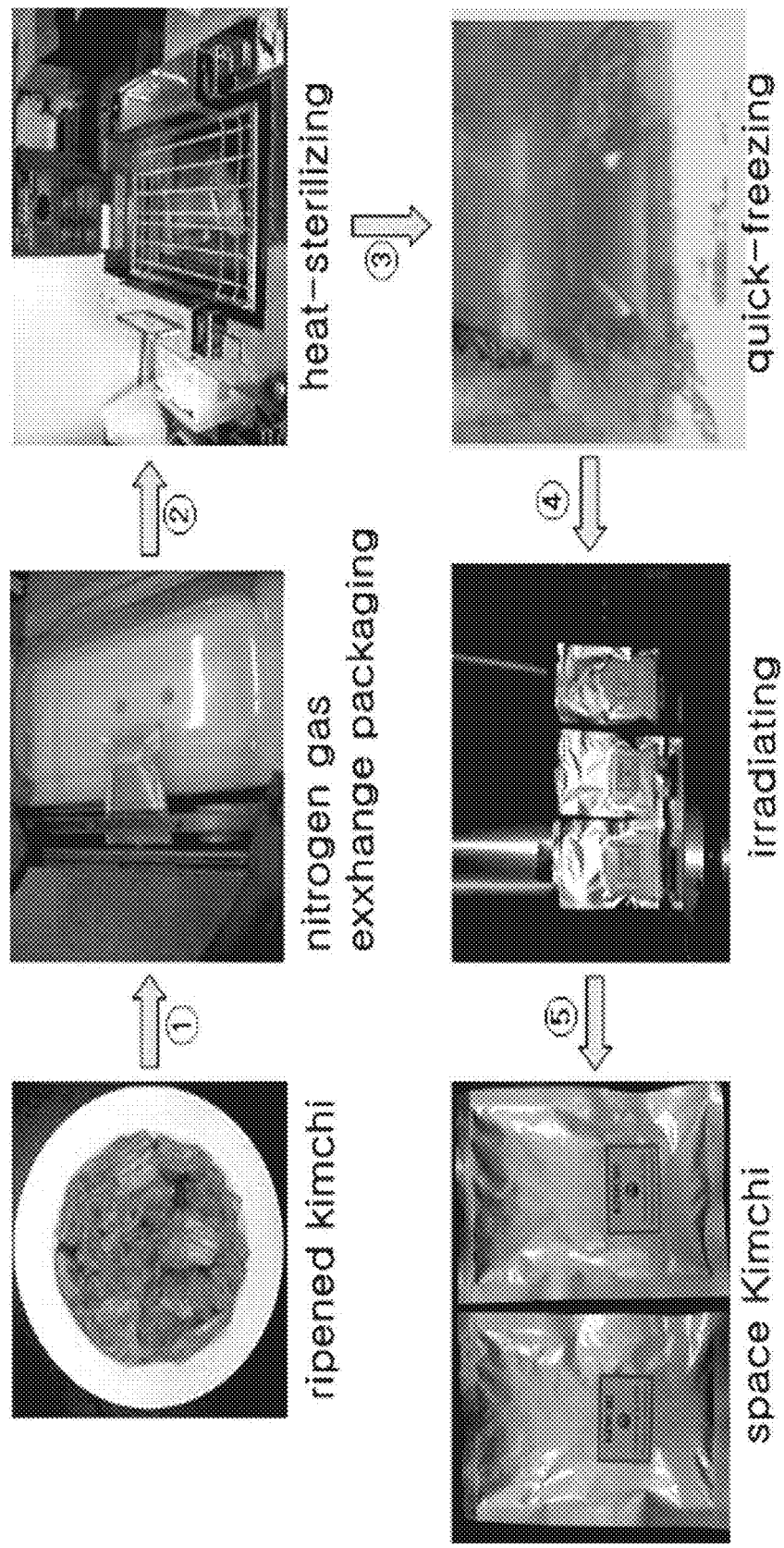
FIG. 1 is a set of photographs illustrating the manufacturing process for Kimchi with excellent shelf stability.
Figure 2:
FIG. 2 is a photograph illustrating the gas generations of the ripened Kimchi groups treated with heat after packaging with nitrogen charging (group 1), the nitrogen charging-heating-quick freezing-gamma ray irradiating group (group 2, 25 kGy) and the control group stored for 3 days.
Figure 3:
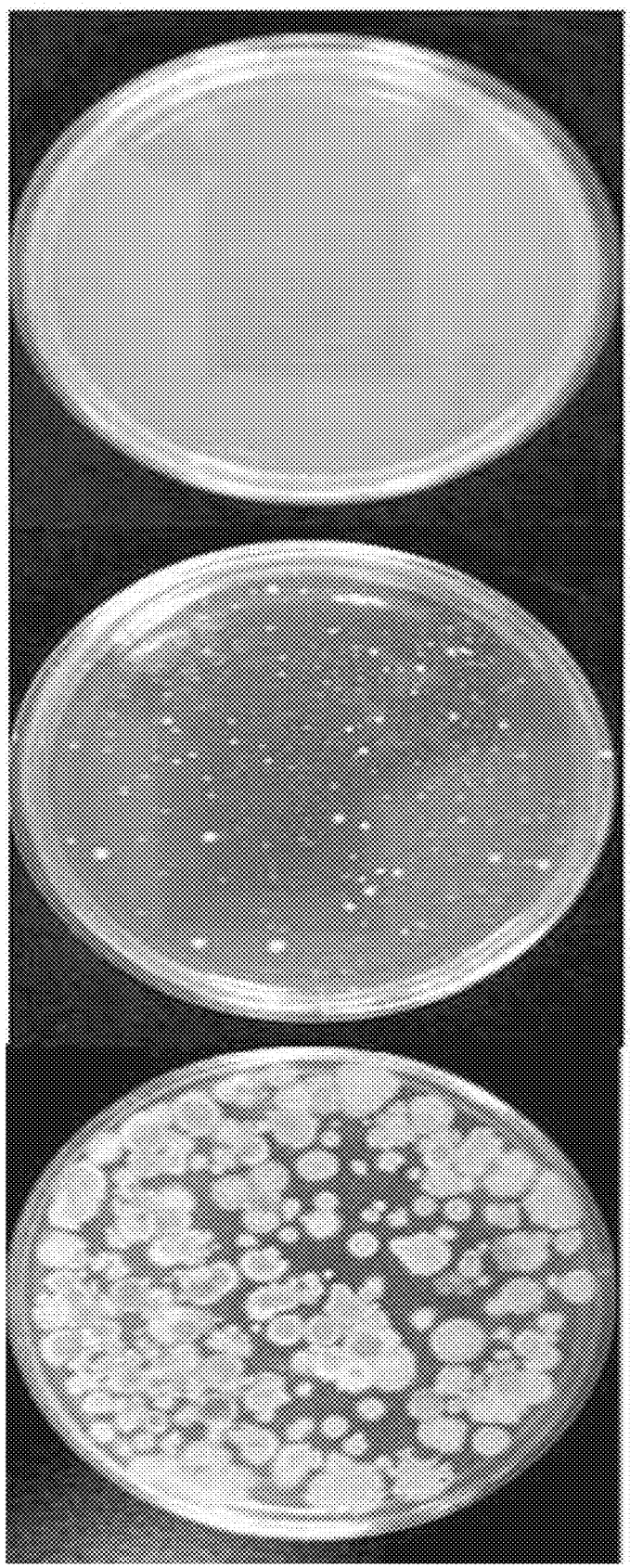
FIG. 3 is a photograph illustrating that the complete inhibition of microorganism (100%) was investigated on plate count agar with the nitrogen charging-heating Kimchi (group 1) nitrogen charging-heating-quick freezing-gamma ray irradiating Kimchi (group 2, 25 kGy) and control, after 28 days of acceleration storage.

Practical and presently preferred embodiments of the present invention are illustrative as shown in the following Examples.

However, it will be appreciated that those skilled in the art, on consideration of this disclosure, may make modifications and improvements within the spirit and scope of the present invention.

Pre-Experimental Example 1

The Effect of Heating Temperature on the Growth of Microorganisms in Kimchi and the Sensory Quality Thereof To evaluate the effect of heating temperature on the growth of microorganisms and the sensory quality of Kimchi, the packed Kimchi was put in a water bath, followed by heating for 30 minutes at 40~80° C. The growth of microorganisms therein and the sensory quality were measured and compared with those of control Kimchi. And the results are shown in Table 1.

TABLE 1

The effect of heating temperature on the growth of microorganisms in Kimchi and the sensory quality of the same

| | Temperature and time of heating | Microorganism number (CFU/g) | Total preference (Overall acceptability) |
|---|---|---|---|
| Control group | — | $2.9 \times 10^8$ | 7.0 |
| Heating group | 40° C., 30 min | $7.3 \times 10^7$ | 6.7 |
| | 50° C., 30 min | $3.6 \times 10^7$ | 6.5 |
| | 60° C., 30 min | $5.4 \times 10^4$ | 6.2 |
| | 70° C., 30 min | $4.8 \times 10^4$ | 5.2 |
| | 80° C., 30 min | $7.0 \times 10^2$ | 3.1 |

As shown in Table 1, the microorganism reducing effect was increased with the increase of the temperature, whereas the sensory quality was reduced with the increase of the temperature. The microorganism reducing effects in the groups treated at 40° C. and 50° C. were poor, whereas the microorganism reducing effect in the group treated at 80° C. was highest but the sensory quality of this group was very low. The microorganism reducing effects in the groups treated at 60° C. and 70° C. were similar. But, the sensory quality of the group treated at 60° C. was higher than that of the group treated at 70° C. Thus, the optimum temperature for the heat treatment of Kimchi was determined to be 60° C.

Pre-Experimental Example 2

The Effect of Irradiation on the Growth of Microorganisms in Kimchi and the Sensory Quality Thereof To investigate the effect of irradiation on the growth of microorganisms in Kimchi and the sensory quality of Kimchi, the packed Kimchi was irradiated with gamma ray at the level of 10 kGy~40 kGy (gamma ray irradiating group). The growth of microorganisms and the sensory quality of the gamma ray irradiating group were investigated and compared with those of control group. And the results are shown in Table 2.

TABLE 2

The growth of microorganisms in Kimchi and the sensory quality of Kimchi according to the radiation dose

| | Irradiation dose (kGy) | Microorganism number (CFU/g) | Total preference (Overall acceptability) |
|---|---|---|---|
| Control group | — | $2.8 \times 10^8$ | 7.0 |
| Gamma ray irradiating group | 10 | $7.4 \times 10^4$ | 4.5 |
| | 15 | $3.8 \times 10^2$ | 3.8 |
| | 20 | ND[1)] | 3.1 |
| | 25 | ND | 2.6 |
| | 30 | ND | 1.8 |
| | 40 | ND | 1.7 |

[1)]ND; Growth of microorganism was not detected.

As shown in Table 2, the microorganism reducing effect in the gamma ray irradiating group was increased with the increase of radiation dose and more specifically no microorganism was detected when the group was treated with more than 20 kGy of gamma ray. However, the sensory quality was reduced with the increase of radiation dose. Therefore, the method had to be modified to prevent the decrease of sensory quality by gamma ray irradiation.

Pre-Experimental Example 3

The Effect of the Gas Condition in the Kimchi Pack on the Sensory Quality of Kimchi Under Irradiation To investigate how the gas condition in the Kimchi pack affects the sensory quality of Kimchi under irradiation, Kimchi packs wrapped in different ways such as air packaging (air packaging group), vacuum packaging (vacuum packaging group) and nitrogen gas exchange packaging (nitrogen gas exchange packaging group) were irradiated with gamma ray at the level of 10 kGy~40 kGy (gamma ray irradiating group) and the results were compared with that of control group. And the results are shown in Table 3.

TABLE 3

The sensory quality of Kimchi affected by the gas condition in the pack under irradiation

| | | Gas condition | | |
|---|---|---|---|---|
| | Radiation Dose (kGy) | Air packaging group | Vacuum packaging group | Nitrogen gas exchange group |
| Control group | — | 7.0 | 7.0 | 7.0 |
| Gamma ray irradiating group | 10 | 4.3 | 4.8 | 5.6 |
| | 15 | 3.6 | 4.2 | 5.0 |
| | 20 | 3.2 | 3.6 | 4.6 |
| | 25 | 2.5 | 3.0 | 4.2 |
| | 30 | 1.5 | 2.2 | 3.1 |
| | 40 | 1.5 | 2.0 | 2.8 |

As shown in Table 3, the sensory quality of Kimchi was reduced with the increase of irradiation dose in every gamma ray irradiating group. However, when the gas condition was changed, the sensory quality of Kimchi was rather increased by the same level of irradiation, and the sensory quality of nitrogen gas exchange packaging group was the highest and vacuum packaging group and air packaging group followed. The above result indicates that deterioration caused by oxidation under gamma irradiation can be prevented by eliminating oxygen by nitrogen charging and vacuum packaging. Therefore, nitrogen gas exchange packaging was confirmed to be the most appropriate method to provide the optimum gas condition in Kimchi pack to prevent deterioration by irradiation.

Example 1

Preparation of Kimchi with Shelf Stability Under the Severe Environment

<1-1> Nitrogen Gas Exchange Packaging after Ripening

Kimchi of the present invention is cabbage Kimchi, which can be prepared by the conventional method and is ripened and fermented for 7 days, considering physicochemical and sensory quality including taste. As a wrapping paper, LDPE laminate film (MULTIVAC, wolfertxchweden, Germany) was used, which is coated with aluminum to interrupt sunshine. The fully ripened Kimchi was cut into 5 cm long pieces and Kimchi juice was eliminated, which was put in the LDPE laminate film pack. The pack was filled with 100% nitrogen gas by using a gas exchanger (Leepack, Hanguk Electronic Korea) and sealed.

<1-2> Heating and Quick-Freezing

The packed Kimchi prepared by nitrogen gas exchange packaging in Example <1-1> was put in a 60° C. water bath, followed by heating for 30 minutes. Then, the Kimchi pack was put in iced water for cooling, followed by freezing at −70° C. for 24 hours.

<1-3> Irradiating

The frozen Kimchi prepared in Example <1-2> was put in a Styrofoam box with 5 cm thickness and 10 cm distance between walls and then taped. The package was irradiated at the level of 125 kGy per minute at room temperature (12±1° C.) in the gamma ray irradiation laboratory (ray source 300,000, Ci, Co-60) of Korea Atomic Energy Research Institute Jeongeup Branch. Irradiation of gamma ray was adjusted to give total absorbed dose of 0, 10, 20, 30 and 40 kGy. The absorbed dose was confirmed by ceric-cerous dosimeter (Bruker Instruments, Germany) and the error of the total absorbed dose was ±0.1 kGy.

The Kimchi irradiated with gamma ray was used for following experiments and every experiment was repeated 5 times using one-way analysis of variance (ANOVA) with SAS Version 5 edition. The significance of mean value was limited to 5% or less by the multiple test of Duncan. Mean value and standard error were presented.

Experimental Example 1

Preparation of Kimchi Sample with Excellent Shelf Stability

To evaluate the effect of irradiation during the deep-freeze after gas exchange packaging and heating on the growth of microorganisms during the acceleration storage of Kimchi, samples were grouped into the control group, the gas exchange packaging and heating group (group 1) and the gas exchange packaging-heating-quick freezing-gamma ray irradiating group (group 2) and tested for the effect.

Experimental Example 2

Investigation of the Growth of Microorganisms in Kimchi with Excellent Shelf Stability of the Present Invention Each Kimchi sample prepared in Experimental Example 1 was stored by acceleration storage (stored at 50° C. for 2 hours and then stored at 35° C.) Following experiments were performed by investigating the growth of microorganisms in Kimchi.

10 g of Kimchi sample was put in a sterilized envelope, to which 90 mL of pre-treated peptone water (0.9% peptone) was added, followed by homogenization for 3 minutes in a homogenizer (Stomacher, Model 400, Tekmar Co., USA) for microorganism assay. The homogenate was left for 10 minutes. 1 mL of the supernatant was obtained and 10-fold diluted. 1 mL of each diluent was distributed on the pre-sterilized plate count agar, followed by culture for 48 hours in a 35° C. incubator. Then, the numbers of microorganism colonies were counted. The microorganism-non-detected medium was further cultured for 24 hours more under the same culture conditions and the growth of microorganism was investigated again.

And the results are shown in Table 4.

TABLE 4

The growth of microorganisms in kimchi during the acceleration storage according to the irradiation dose of gamma ray (unit: CFU/g)

| | Radiation dose (kGy) | Right after | Storage time (day) | | | |
|---|---|---|---|---|---|---|
| | | | 7 | 14 | 21 | 28 |
| Control group | — | $2.6 \times 10^8$ | —[1] | — | — | — |
| Group 1 | — | $6.6 \times 10^4$ | $2.3 \times 10^5$ | $8.9 \times 10^5$ | $1.6 \times 10^6$ | $3.7 \times 10^6$ |
| Group 2 | 10 | $5.0 \times 10^3$ | $6.0 \times 10^2$ | $3.0 \times 10^3$ | $2.7 \times 10^3$ | $3.1 \times 10^3$ |
| | 15 | ND[2] | $4.6 \times 10^2$ | $2.8 \times 10^2$ | $1.0 \times 10^2$ | $1.8 \times 10^2$ |
| | 20 | ND | ND | ND | ND | ND |
| | 25 | ND | ND | ND | ND | ND |
| | 30 | ND | ND | ND | ND | ND |
| | 40 | ND | ND | ND | ND | ND |

[1]—; Wrap paper was damaged and gas was leaked by over-fermentation.
[2]ND; Growth of microorganism was not detected.

As shown in Table 4, the control group showed the typical numbers of microorganisms of fermented foods ($10^8$ CFU/g) at the time of full ripening. In group 1 (heat treatment without irradiation), the growth of microorganism was inhibited but approximately $10^4$ CFU/g of microorganisms were still alive. In the meantime, in the group treated with irradiation after quick-freezing, the growth of microorganism was significantly inhibited and not observed at the irradiation dose of 20 kGy. In the control group, wrap paper was damaged by gas generation by excessive fermentation. Thus, quantification of microorganism was impossible. In the group 1, the growth of microorganism was a little increased. The growth of microorganism was detected in the experimental group irradiated with 10 kGy of gamma ray, but no more microorganism growth was detected during the preservation. The growth of microorganism was observed on the $7^{th}$ day of preservation in the group irradiated with 15 kGy of gamma ray, but no more microorganism growth was observed from then on. It is the present inventor's judgment that the inhibition of the growth of microorganism in the gas exchange packaging-heating group, the 10 kGy gamma ray-irradiating group and the 15 kGy gamma ray-irradiating group is resulted from the nitrogen charging, which is an anaerobic condition interrupting the growth of microorganism. In the group irradiated with gamma ray at the level of 20 kGy or more, the microorganisms in kimchi were completely killed and thus no more microorganism growth was observed.

Therefore, co-treatment of nitrogen gas exchange packaging, heating, freezing and irradiating enables complete elimination of microorganisms in kimchi, so that kimchi can be long-term preserved under the severe environment.

Experimental Example 3

Physicochemical Quality Evaluation of Kimchi with Excellent Shelf Stability of the Invention The change of physicochemical quality during the acceleration storage after gas exchange packaging, heating, quick-freezing and irradiating was investigated and represented by using pH as an index.

pH changes during the acceleration storage of kimchi prepared in Experimental Example 1 were investigated. 10 g of Kimchi sample was grinded with a vegetable grinder (GP-1619, Greenpower Ltd, Korea), followed by filtering with gauze. The pH of the filtered solution was measured by using a pH meter (Corning 220, USA). And the results are shown in Table 5.

TABLE 5 pH changes during the acceleration storage of kimchi according to the radiation dose of gamma ray

| | Radiation dose (kGy) | Right after | Storage time (day) | | | |
|---|---|---|---|---|---|---|
| | | | 7 | 14 | 21 | 28 |
| Control group | — | 4.56 | —[1] | — | — | — |
| Group 1 | — | 4.64 | 3.71 | 3.61 | 3.63 | 3.59 |
| Group 2 | 10 | 4.56 | 4.53 | 4.46 | 4.43 | 4.38 |
| | 15 | 4.55 | 4.56 | 4.62 | 4.63 | 4.46 |
| | 20 | 4.58 | 4.59 | 4.61 | 4.67 | 4.64 |
| | 25 | 4.63 | 4.61 | 4.56 | 4.62 | 4.54 |
| | 30 | 4.61 | 4.56 | 4.58 | 4.57 | 4.62 |
| | 40 | 4.61 | 4.54 | 4.48 | 4.63 | 4.58 |

[1]—, Wrap paper was damaged and gas was leaked by over-fermentation.

As shown in Table 5, pH of kimchi right after the treatment was 4.55~4.66. No pH changes were observed by heating and irradiating. The control group was no good for commercial product because of gas generation and damage of package and thus the sample was not tested for the physicochemical quality. pH was significantly decreased on the $1^{st}$ week of storage in group 1 (heating group) but after the first week no more pH changes were observed. However, in irradiating group 2, pH was slowly but continuously decreased during the storage by the irradiation at the level of 10 kGy. Other irradiating groups showed no pH changes. The results also indicate that pH is closely related, to the existence and the growth of microorganism. pH of the fully ripened kimchi is 4.4~4.7 and the fermentation continues during the storage to generate organic acids like lactic acid, resulting in the decrease of pH and acidic taste. However, pH of the kimchi of the invention prepared according to the Experimental Example 1 was maintained without change, suggesting that no more fermentation was progressed and thus the freshness was maintained.

Experimental Example 4

Evaluation of the Sensory Quality of Kimchi with Excellent Shelf Stability of the Present Invention The effect of the irradiation after gas exchange packaging, heating and quick-freezing on the sensory quality of kimchi during the acceleration storage was evaluated by using 7 point method.

The sensory quality was investigated on the day (day 0) of manufacturing kimchi according to Experimental Example 1, on the 14$^{th}$ day and 28$^{th}$ day of acceleration storage. Each sample was given for relative evaluation to 12 sensory evaluating agents who were pre-instructed about the sensory characteristics of fully ripened kimchi, followed by evaluation on color, texture, taste, flavor, smell (radiation smell) and total preference. And the results are shown in Tables 6, 7 and 8.

TABLE 6

The results of the evaluation on the sensory quality of kimchi right after the preparation according to the irradiation dose of gamma ray

| Radiation Dose | Evaluation item | | | | | |
|---|---|---|---|---|---|---|
| (kGy) | Color | Texture | Taste | Flavor | Smell | Preference |
| Control group | — | 7.0 | 7.0 | 7.0 | 7.0 | 1.0 | 7.0 |
| Group 1 | — | 6.0 | 6.6 | 6.6 | 6.3 | 1.1 | 6.3 |
| Group 2 | 10 | 5.5 | 5.3 | 5.6 | 5.0 | 1.4 | 5.8 |
| | 15 | 5.8 | 5.1 | 5.3 | 5.8 | 1.8 | 5.4 |
| | 20 | 5.2 | 5.2 | 5.0 | 5.4 | 2.2 | 5.1 |
| | 25 | 5.4 | 4.8 | 4.5 | 5.0 | 2.8 | 4.8 |
| | 30 | 4.2 | 4.1 | 3.7 | 4.0 | 3.3 | 3.5 |
| | 40 | 3.6 | 3.5 | 3.4 | 3.6 | 3.5 | 3.1 |

TABLE 7

The results of the evaluation on the sensory quality of kimchi on the 14$^{th}$ day of acceleration storage according to the irradiation dose of gamma ray

| Radiation Dose | Evaluation item | | | | | |
|---|---|---|---|---|---|---|
| (kGy) | Color | Texture | Taste | Flavor | Smell | Preference |
| Control group | — | —[1] | — | — | — | — | — |
| Group 1 | — | 4.7 | 3.7 | 3.6 | 3.8 | 3.3 | 3.7 |
| Group 2 | 10 | 4.5 | 4.5 | 4.4 | 4.4 | 3.3 | 4.3 |
| | 15 | 4.3 | 4.0 | 4.5 | 4.8 | 3.2 | 4.6 |
| | 20 | 5.5 | 5.3 | 5.0 | 5.1 | 2.7 | 5.3 |
| | 25 | 5.1 | 5.0 | 4.7 | 4.9 | 3.0 | 4.8 |
| | 30 | 3.8 | 3.5 | 3.6 | 3.5 | 3.2 | 3.3 |
| | 40 | 3.2 | 3.2 | 3.0 | 3.4 | 3.6 | 3.2 |

[1]—, Evaluation of the sensory quality was impossible because of the excessive fermentation.

TABLE 8

The results of the evaluation on the sensory quality of kimchi on the 28$^{th}$ day of acceleration storage according to the irradiation dose of gamma ray

| Radiation Dose | Evaluation item | | | | | |
|---|---|---|---|---|---|---|
| (kGy) | Color | Texture | Taste | Flavor | Smell | Preference |
| Control group | — | —[1] | — | — | — | — | — |
| Group 1 | — | 3.8 | 2.8 | 3.1 | 3.3 | 3.9 | 3.2 |
| Group 2 | 10 | 4.2 | 4.0 | 3.9 | 3.8 | 3.8 | 4.0 |
| | 15 | 4.4 | 4.2 | 4.1 | 4.0 | 3.5 | 4.3 |
| | 20 | 5.2 | 5.5 | 5.3 | 5.0 | 2.8 | 5.2 |
| | 25 | 5.3 | 5.1 | 4.9 | 4.7 | 3.1 | 5.0 |
| | 30 | 4.0 | 3.8 | 3.7 | 3.6 | 3.3 | 3.5 |
| | 40 | 3.6 | 3.0 | 3.2 | 3.3 | 3.7 | 3.1 |

[1]—, Evaluation of the sensory quality was impossible because of the excessive fermentation.

As shown in Table 6, the sensory quality of group 1 (gas exchange packaging-heating group) right after the manufacturing was a little deteriorated, compared with the control group. The sensory quality of group 2 (gas exchange packaging-heating-quick freezing-irradiating group) was reduced slowly with the increase of the radiation dose. However, the total preference was more than the average (point 4) as a whole when each sample was irradiated with gamma ray at the level of 25 kGy or less. Therefore, it was confirmed that co-treatment of gas exchange packaging and quick freezing and irradiating prevents the deterioration of the sensory quality by irradiation.

The sensory quality of kimchi was also investigated on the 14$^{th}$ day of acceleration storage. As shown in Table 7, the control group was not be able to be tested because of the excessive fermentation. The sensory quality of the heating group (group 1) was also significantly decreased because of the active growth of microorganisms, resulting in acidy taste. However, the sensory quality of group 2 was remained unchanged, compared with right after manufacturing, by gamma ray irradiation at the level of 20 kGy or more, which was able to inhibit the growth of microorganisms. As confirmed in Table 4 (illustrating the growth of microorganisms) and Table 5 (illustrating pH changes), gamma ray irradiation could eliminate microorganisms completely, so that no more microorganism growth was detected and the sensory quality could be maintained.

The sensory quality of kimchi was measured on the 28$^{th}$ day of acceleration storage (Table 8). As a result, the control group could not be tested because of excessive fermentation. The sensory quality of group 1 was continuously reduced and the sensory quality of group 2 irradiated with gamma ray at the level of 15 kGy or less was also reduced, in which the growth of microorganism was still observed even though not active. However, another group irradiated with gamma ray at the level of 20 kGy or more maintained the sensory quality as good as right after manufacturing. The above results indicate that the optimum level of gamma ray for maintaining the sensory quality is 20~25 kGy when irradiation was performed after gas exchange packaging, heating and quick freezing.

INDUSTRIAL APPLICABILITY

As explained hereinbefore, the manufacturing method of kimchi of the invention including irradiation after nitrogen gas exchange packaging, heating and quick freezing prevents the deterioration of the sensory quality caused by heat treatment and irradiation and thus produces kimchi with long-term shelf stability under the severe environment such as desert and space. The method can be further applied to produce and preserve other fermented foods having similar characteristics with kimchi.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A method for preparing kimchi with long-term shelf stability in a severe environment comprising:
   1) packaging ripened kimchi with gas charging;
   2) sterilizing the packed kimchi obtained from step 1) by heat-treatment as primary sterilization;
   3) freezing the sterilized kimchi by storing the sterilized kimchi obtained from step 2) at −50° C. to −70° C.; and
   4) irradiating the frozen kimchi obtained from step 3) with gamma ray at the irradiation dose of 20-25 kGy,
   wherein the severe environment is desert, alpine regions, poles or spaces.

2. The method according to claim 1, wherein the major constituent of the kimchi is selected from the group consisting of Korean cabbage, radish, leaf mustard, scallion, onion, cucumber, dropwort and Korean leek.

3. The method according to claim 1, wherein the ripened kimchi of step 1) has pH 3.5~5.5 or acidity 0.2~0.8%.

4. The method according to claim 1, wherein the gas of step 1) is selected from the group consisting of vacuum (oxygen free), nitrogen ($N_2$) and carbon dioxide ($CO_2$).

5. The method according to claim 1, wherein the heating temperature for step 2) is 40° C.~80° C.

6. The method according to claim 1, wherein the heating temperature for step 2) is 60° C.~65° C.

* * * * *